United States Patent
Nielsen et al.

(10) Patent No.: US 9,600,755 B2
(45) Date of Patent: Mar. 21, 2017

(54) CARD, AN ASSEMBLY, A METHOD OF ASSEMBLING THE CARD AND A METHOD OF OUTPUTTING INFORMATION

(71) Applicant: CARDLAB APS, Herlev (DK)

(72) Inventors: Finn Nielsen, Copenhagen S (DK); Finn Speiermann, Virum (DK)

(73) Assignee: CARDLAB APS, Herlev (DK)

( * ) Notice: Subject to any disclaimer, the term of this patent is extended or adjusted under 35 U.S.C. 154(b) by 0 days.

(21) Appl. No.: 14/783,650

(22) PCT Filed: Apr. 14, 2014

(86) PCT No.: PCT/EP2014/057502
§ 371 (c)(1),
(2) Date: Oct. 9, 2015

(87) PCT Pub. No.: WO2014/167136
PCT Pub. Date: Oct. 16, 2014

(65) Prior Publication Data
US 2016/0042266 A1   Feb. 11, 2016

(30) Foreign Application Priority Data
Apr. 12, 2013   (WO) ................. PCT/EP2013/057671

(51) Int. Cl.
*G06K 7/06* (2006.01)
*G06K 19/06* (2006.01)
*G06K 7/08* (2006.01)

(52) U.S. Cl.
CPC ....... *G06K 19/06196* (2013.01); *G06K 7/084* (2013.01); *G06K 19/06206* (2013.01)

(58) Field of Classification Search
CPC ............. G06K 19/06206; G06K 7/084; G06K 19/06196; G06K 19/07; G06K 19/07749;
(Continued)

(56) References Cited

U.S. PATENT DOCUMENTS

| 4,158,433 | A | 6/1979 | Peterson et al. |
| 4,304,992 | A | 12/1981 | Kobayashi et al. |

(Continued)

FOREIGN PATENT DOCUMENTS

| CA | 2317642 A1 | 3/2001 |
| DE | 19618144 C1 | 4/1997 |

(Continued)

OTHER PUBLICATIONS

International Search Report dated May 28, 2015 issued in corresponding International Application No. PCT/EP2014/057502.

*Primary Examiner* — Thien M Le
(74) *Attorney, Agent, or Firm* — Harness, Dickey & Pierce, PLC

(57) ABSTRACT

A card configured to output an magnetic field on or at a surface thereof, the card comprising an elongated magnetically conducting material on or at the surface of the card, the magnetically conducting material having a first and a second guide ends, and a field generator positioned so as to feed a magnetic field into the magnetically conducting material. The magnetically conducting material is positioned at the position where the reading head travels and forms a return path for the field generated by the field generator, whereby field from the generator is fed to the reading head via the magnetically conducting material.

21 Claims, 2 Drawing Sheets

Figure 1:
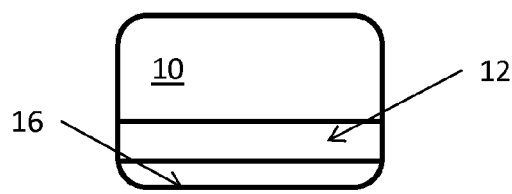

(58) Field of Classification Search
CPC ......... G06K 19/06187; G06K 19/0723; G06K 19/07779; G06K 19/07783; G06K 19/07784; G06K 7/015; G06K 7/10336; G06Q 20/341
USPC ................ 235/449, 375, 492, 486, 487, 488
See application file for complete search history.

(56) References Cited

U.S. PATENT DOCUMENTS

| | | | |
|---|---|---|---|
| 4,825,056 A | | 4/1989 | Ohta et al. |
| 4,829,166 A | | 5/1989 | Froelich |
| 5,159,182 A | | 10/1992 | Eisele |
| 5,563,948 A | | 10/1996 | Diehl et al. |
| 5,585,787 A | | 12/1996 | Wallerstein |
| 5,627,355 A | | 5/1997 | Rahman et al. |
| 5,650,606 A | * | 7/1997 | Baus, Jr. ................ G06K 7/084 235/449 |
| 5,913,203 A | | 6/1999 | Wong et al. |
| 5,937,394 A | | 8/1999 | Wong et al. |
| 5,955,961 A | | 9/1999 | Wallerstein |
| 5,956,699 A | | 9/1999 | Wong et al. |
| 6,186,398 B1 | * | 2/2001 | Kato ................ G06K 19/06196 235/449 |
| 6,325,285 B1 | | 12/2001 | Baratelli |
| 6,592,044 B1 | | 7/2003 | Wong et al. |
| 6,607,127 B2 | | 8/2003 | Wong |
| 6,607,362 B2 | | 8/2003 | Lum |
| 6,609,654 B1 | | 8/2003 | Anderson et al. |
| 6,657,538 B1 | | 12/2003 | Ritter |
| 6,715,679 B1 | | 4/2004 | Infosino |
| 6,755,341 B1 | | 6/2004 | Wong et al. |
| 6,805,288 B2 | | 10/2004 | Routhenstein et al. |
| 6,811,082 B2 | | 11/2004 | Wong |
| 7,195,154 B2 | | 3/2007 | Routhenstein |
| 7,278,025 B2 | | 10/2007 | Saito et al. |
| 7,503,485 B1 | | 3/2009 | Routhenstein |
| 7,559,464 B2 | | 7/2009 | Routhenstein |
| 7,693,798 B2 | | 4/2010 | Anderson et al. |
| 7,748,616 B2 | | 7/2010 | Wong et al. |
| 7,874,480 B2 | | 1/2011 | Routhenstein |
| 7,954,724 B2 | | 6/2011 | Poidomani et al. |
| 8,191,772 B2 | | 6/2012 | Anderson et al. |
| 8,226,001 B1 | | 7/2012 | Foo et al. |
| 8,231,063 B2 | | 7/2012 | Poidomani et al. |
| 8,286,889 B2 | | 10/2012 | Poidomani et al. |
| 8,302,871 B2 | | 11/2012 | Poidomani et al. |
| 8,317,103 B1 | | 11/2012 | Foo et al. |
| 8,360,332 B2 | | 1/2013 | Poidomani et al. |
| 8,376,239 B1 | | 2/2013 | Humphrey |
| 8,480,002 B2 | | 7/2013 | Poidomani et al. |
| 8,500,019 B2 | | 8/2013 | Poidomani et al. |
| 8,540,165 B2 | | 9/2013 | Foo et al. |
| 8,678,276 B2 | | 3/2014 | Poidomani et al. |
| 8,684,267 B2 | | 4/2014 | Foo et al. |
| 8,690,055 B2 | | 4/2014 | Anderson et al. |
| 2002/0032657 A1 | | 3/2002 | Singh |
| 2003/0106935 A1 | | 6/2003 | Burchette |
| 2004/0035942 A1 | | 2/2004 | Silverman |
| 2004/0129787 A1 | | 7/2004 | Saito et al. |
| 2004/0133787 A1 | | 7/2004 | Doughty et al. |
| 2006/0091989 A1 | | 5/2006 | Vinciarelli et al. |
| 2006/0124756 A1 | * | 6/2006 | Brown ............. G06K 19/06206 235/492 |
| 2006/0283958 A1 | | 12/2006 | Osterweil |
| 2007/0176622 A1 | | 8/2007 | Yamazaki |
| 2010/0110585 A1 | * | 5/2010 | Takano ................ G11B 5/3116 360/123.12 |
| 2012/0187199 A1 | | 7/2012 | Poidomani et al. |
| 2012/0325914 A1 | * | 12/2012 | Herslow ................ B32B 37/02 235/488 |
| 2013/0299586 A1 | * | 11/2013 | Yesil ...................... G06K 7/084 235/449 |
| 2013/0320080 A1 | * | 12/2013 | Olson ............. G06K 19/06206 235/380 |
| 2014/0117094 A1 | * | 5/2014 | Workley ................ G06K 7/084 235/492 |

FOREIGN PATENT DOCUMENTS

| | | |
|---|---|---|
| DE | 19648767 A1 | 6/1997 |
| EP | 0373411 A2 | 6/1990 |
| EP | 0994439 A2 | 4/2000 |
| EP | 1231562 A1 | 8/2002 |
| EP | 1326196 A1 | 7/2003 |
| GB | 2243235 A | 10/1991 |
| JP | 5049959 B2 | 10/2012 |
| JP | 5186539 B2 | 4/2013 |
| RU | 2062507 C1 | 6/1996 |
| RU | 2216114 C2 | 11/2003 |
| WO | WO-00/49561 A1 | 8/2000 |
| WO | WO-01/31577 A1 | 5/2001 |
| WO | WO-01/52204 A1 | 7/2001 |
| WO | WO-2008/104567 A1 | 9/2008 |

\* cited by examiner

CARD, AN ASSEMBLY, A METHOD OF ASSEMBLING THE CARD AND A METHOD OF OUTPUTTING INFORMATION

CROSS-REFERENCE TO RELATED APPLICATIONS

This is a National Phase of PCT Patent Application No. PCT/EP2014/057502, filed on Apr. 14, 2014, which claims priority under 35 U.S.C. §119 to PCT Patent Application No. PCT/EP2013/057671, filed on Apr. 12, 2013, the contents of each of which are hereby incorporated by reference in their entirety.

The present invention relates to a new type of card configured to output an magnetic field.

Credit cards of this type may be seen in e.g. WO01/52204, EP1326196, U.S. Pat. No. 6,325,285, WO01/31577, WO00/49561, EP0994439, US2004/133787, EP1231562, US2003/106935, GB2243235, U.S. Pat. No. 4,158,433, DE19648767, DE19618144, U.S. Pat. No. 5,627,355, CA2317642, U.S. Pat. No. 6,715,679, CA2317642, U.S. Pat. No. 7,278,025, U.S. Pat. No. 4,829,166, U.S. Pat. No. 4,825,056, US2002/032657, RU2062507, U.S. Pat. No. 5,563,948, RU2216114, U.S. Pat. No. 6,657,538, U.S. Pat. No. 4,304,992, US2004/0035942, US2007/0176622, U.S. Pat. No. 6,607,362, US2004/0129787, US2006/0283958, U.S. Pat. No. 8,376,239, US2012/187199, EP0373411, and US2006/0091989.

In a first aspect, the invention relates to a card configured to output a magnetic field on or at a surface thereof, the card comprising:
  an elongated magnetically conducting material on or at the surface of the card, the magnetically conducting material having a first and a second guide ends, and
  a field generator positioned so as to feed a magnetic field into at least the guide ends of the magnetically conducting material,
where the conducting material and the field generator, at a position along a longitudinal direction of the conducting material and in a plane perpendicular to the longitudinal direction, have non-overlapping cross-sectional areas.

The card could be configured to output the magnetic field along a predetermined curve on or at the surface, where the magnetically conducting material on or at the surface of the card could be positioned at the predetermined curve.

The overall intention with the card is that the field generator is configured to feed a magnetic field into the magnetically conducting material, where a reading head positioned over the magnetically conducting material will then be able to detect this field e.g. in the same manner as in the old-fashioned magnetic strip cards.

In this context, a card may have the same dimensions as a credit card, as e.g. defined in ISO/IEC 7810 ID-1: 85.60× 53.98 mm, with a thickness of 0.76 mm, as is the most widely used dimension for banking and ID cards. The present card thus preferably is a flat, thin, rectangular card configured to be received in ATMs and other card readers used for entrance control, funds transfer, banking operations, cash withdrawal and the like. These card readers may be swipe type readers where a user is requested to swipe the card through a slit, inside which a card reading head is positioned, or readers configured to receive a card into a slot of a housing and which automatically translate or move the card to a reader head provided inside the housing.

The present card preferably is bendable and generally fulfils other parts of ISO/IEC 7810 ID-1, such as the bendability and dimensional stability. This standard also relates to flammability, toxicity, resistance to chemicals, resistance to deterioration from exposure to light and heat, as well as the durability of the card. Naturally, these requirements are also desired fulfilled, but such demands may differ from situation to situation, whereby such requirements may not always be required fulfilled.

Naturally, other card shapes or dimensions may be selected outside this standard, which is widely used but in no way a limitation to the invention. Thus, cards of other shapes, such as square, triangular, circular, oval and with other thicknesses and other dimensions are equally useful in accordance to the invention.

The card is configured to provide a magnetic field at or on the surface and along the magnetically conducting material on or at the surface of the card. The intention is to emulate the operation of an old-fashioned credit card when a reading head is translated along the magnetic strip thereof. However, differences exist. For example, the present field of the card according to the invention need not vary along the magnetically conductive material. Instead, the field may be made to vary over time, so that a reading head, stationary or moving in relation to the card, may detect a varying magnetic field. In fact, typically the same signal and field is output over all of the magnetically conducting material at any point in time. Thus, the actual position of the reader in relation to the magnetically conducting material may be irrelevant or of little relevance.

The positions of this magnetically conducting material or track is defined in e.g. 1507811-2 in relation to cards with the dimensions as defined above. The position of the magnetically conducting material thus is not necessarily illustrated on the card and may or may not be seen as a predetermined set of positions on the surface of the card.

Thus, the card may comprise a controller configured to output to the field generator an electrical signal which, in the field generator, may be converted into the magnetic field—preferably a field varying over time and having therein information to be output from the card. This information may be the information or the type(s) of information output by standard credit/ID cards.

In this context, the magnetically conductive material will usually start and end within the boundaries of the card, such as the outer boundaries of the card when seen directly from above a main surface or side thereof. This magnetically conductive material may have any shape, such as a bent, V-shaped, U-shaped, S-shaped shape, but a straight line is preferred. Usually, this straight line is selected or defined to be parallel to an edge or side of the card.

The card surface usually will be a major or main surface of the card, such as one of the largest surfaces of the card where, often, printed information, such as user name, signatures, logos and the like, is provided. Often, the surface is flat or plane.

The magnetically conductive material may be positioned along a curve, on or at the surface or in a projection on to this surface, at which the magnetic field is desired or required. Thus, the curve may be a track on the card directly over which a reading head or coil is supposed to be translated for detecting the field emitted by the card. Consequently, the curve often will be determined or dictated by a reader or a standard defining the relative positions of the card and a reading head/coil.

The magnetically conducting material is elongated. In this context, an elongated element has a longest dimension and has a width, perpendicular to the longest dimension, which is shorter than the longest dimension, such as no more than 50%, such as no more than 20% of the longest dimension.

Preferably, the length of the elongated magnetically conducting material is a predetermined percentage of the curve or a width/length of the card along the same curve or direction. This percentage may be 50% or more, such as 75% or more. Alternatively to the percentage of the width, a maximum distance from a card edge to the pertaining end may be defined.

A magnetically conducting material preferably is a material with $\mu r>10$, such as $\mu r>50$, preferably $\mu r>100$, such as $\mu r>500$, in order for the magnetically conductive material to be operative to collect and guide the field generated by the field generator.

The magnetically conducting material is preferably provided on or at the surface at the curve. Thus, the material preferably at least substantially overlaps the curve when both are projected on to the surface of the card.

The magnetically conducting material may form part of the surface or may be provided in a material defining a part of this surface, such as if the material is embedded in a layer forming the surface. Alternatively, the material may be protected from e.g. wear and oxidation where a layer is provided between the material and the surface. Preferably, a layer thickness of no more than e.g. 0.5 mm, such as no more than 0.3 mm is provided between the material and the surface, as the larger the distance between the material and the surface, the larger the distance to the reading head, and consequently, the less field available for detection in the head.

In many situations, the magnetically conductive material will be provided in a plane parallel to a plane of the surface. In some situations, however, the magnetically conducting material may have a varying distance to the surface along its length, so as to, in this manner, e.g. adapt the field strength output by the material at the surface along its length. In one situation, the magnetically conducting material has a larger distance to the surface at a central portion thereof in order for the field strength at the surface of the card to be at least substantially the same (such as within 25%) along the length of the curve.

In this context, the field generator is an element or device configured or able to output a magnetic field. A typical field generator comprises a coil which is suitable for converting an electrical signal into a magnetic field. The coil may therein have a core if desired.

When the conducting material and the field generator, at a position along a longitudinal direction of the conducting material and in a plane perpendicular to the longitudinal direction, have non-overlapping cross-sectional areas, the two elements are preferably formed by two separate parts. In this situation, the non-overlapping means that the two elements are positioned beside each other and not one inside the other. Another manner of defining this is that circumscribing curves are non-overlapping. The field generator and the conducting material preferably are separate elements which, as is described below, have no electrical contact and may, prior to incorporation into the card, be handled separately. The two elements may not be directly physically connected to each other but may be indirectly connected to each other via another element, such as a structural part of the card.

In a preferred embodiment, the cross sectional areas or a circumscribing curve, are non-overlapping in the cross section or plane. This may be the situation at one or a plurality of positions along the direction, such as over all of or a major part (minimum 50% or more) of a length of the conducting material where, in the cross section, the field generator is present.

Preferably, the generator has two ends at which a part of, such as a major part of, the magnetic field is output. Preferably, the ends of the generator are positioned close to the magnetically conducting material to facilitate the field transport from the generator to the magnetically conducting material. The aim may be to position the generator and magnetically conducting element so that the magnetically conducting material provides a significant return path for the field output by the generator.

The card or the field generator may also comprise a driver for providing a signal to the generator. This signal may vary over time so as to embed, in the signal and thus the magnetic field generated, information. This time variation may result in the outputting of an magnetic field varying in the same manner as that detected by a reading head travelling along a magnetic track of an old-fashioned magnetic card. The magnetic field of the card according to the invention may, however, in some situations be detected by a reading head independently of whether the head is stationary in relation to the card or moving along the curve and magnetically conducting material.

The feeding of the magnetic field into the magnetically conducting material usually will be automatic and be determined from the relative positions of the field generator and the magnetically conducting material, such as the ends thereof. Also, the surroundings of the card and the parts of the card surrounding the generator and the magnetically conducting material may influence the amount of field collected by the magnetically conducting material.

Naturally, the return path may be obtained irrespective of where the magnetic field is introduced into the magnetically conducting material. Thus, the ends of the generator may be positioned at any position along the length of the magnetically conducting material.

The guide ends normally will be positioned at the two parts of the elongated magnetically conducting material which are the farthest from each other. The ends of a rectangular element may be the two opposing, smaller sides.

Then, the guide ends of the magnetically conducting material may be provided close to the ends of the field generator so that the field from the generator enters the magnetically conducting material at the guide ends.

In this context, the distance between a generator end and the corresponding magnetically conducting material end may be 1 mm or less, such as 0.5 mm or less, such as 0.3 mm or less. This distance may be the distance at the ends of the generator or a distance between the above cross sections or circumscribing curves, in the cross section or plane.

Preferably, the card has no other material than the magnetically conducting material which has $\mu r>100$, such as $\mu r>10$, within a distance of 1 mm of the curve or the magnetically conducting material or the generator. This aids in optimizing the amount of the magnetic field which opts to travel back via the magnetically conducting material.

As mentioned above, the curve or magnetically conductive material normally is positioned at a standardized position. This is an advantage in that the readers then may also be configured to read all cards. The above-mentioned standard is the most widely used.

Thus, in one embodiment, the card has an outer, at least substantially straight side and wherein the curve or magnetically conductive material is a straight line being at least substantially parallel to the side and positioned between 6.9 mm and 7.2 mm from the side.

In another embodiment, the card has an outer, at least substantially straight side and wherein the curve or magnetically conductive material is a straight line being at least substantially parallel to the side and positioned between 10.2 mm and 10.5 mm from the side.

The two embodiments may be combined, when the card has multiple magnetically conductive materials and multiple generators, one magnetically conductive material being positioned at one distance and being fed by one generator and another material positioned at another distance and being fed by another generator.

In order to facilitate the withdrawal/exiting of a part of the field from the magnetically conductive material, its magnetic properties preferably are adapted for this use. Thus, preferably, the magnetically conducting material has a magnetic conductivity of no more than 500,000 μr, such as no more than 300,000 μr, such as no more than 100,000 μr, such as no more than 50,000 μr, preferably no more than 10,000 μr, such as no more than 5,000 μr, such as no more than 2000 μr. Presently, the desired magnetically conductive material has a μr of about 1600, but this will depend on a number of parameters, such as the μr of the reading head. The higher the μr of the reading head, the easier will the field exit the magnetically conducting material, and the higher may the μr of the magnetically conducting material be chosen.

In one embodiment, the magnetically conducting material has a thickness, in a direction perpendicular to the surface, of less than 500 μm, such as 5-200 μm, such as 10-100 μm. On the one side, a thicker magnetically conducting material will be able to attract or transport more field strength, but if the thickness becomes too large, the field transported the farthest from the surface may experience a too large reluctance to take part in the field travelling closer to the surface and a part of which enters the reading head. This may be solved by choosing a magnetically conducting material with a higher μr in the direction toward the surface than along the plane of the surface.

The width of the magnetically conducting material preferably is no more than 5 mm, such as no more than 3 mm, such as around 2.5 mm.

In general, the magnetically conducting material may be a metal. The magnetically conducting material may be a monolithic material, such as a foil or tape. Alternatively, the magnetically conducting material may be a powder moulded or otherwise provided into a carrier material, such as plastics, a polymer or the like. The magnetically conductive material may form part of a plastic sheet provided on the card. This may be obtained using co-extrusion, embedding, moulding or the like.

In one embodiment, the field generator comprises an elongated coil, optionally with a core therein if desired. This field generator may be positioned at least substantially parallel to the magnetically conductive material. In another situation, the distance between the magnetically conductive material and the coil may be larger at a central position than at ends thereof in order to adapt the field strength exiting the coil at positions between the ends thereof and entering the magnetically conductive material between the ends thereof. In this manner, the overall field strength in the magnetically conductive material may be controlled along the length thereof.

Preferably, if a core is present, the core or core material has a magnetic conductivity of at least 1000 μr, such as at least 2000 μr, preferably at least 5000μ, such as at least 7500 μr, preferably at least 9000 μr. The presently preferred coil material has a μr of about 10,000.

In one embodiment, in a cross section perpendicular to the curve or longitudinal direction of the magnetically conductive material, the field generator is positioned no more than 3 mm, such as 1 mm or less, from the magnetically conductive material. This may be to ensure that a sufficient amount of the field generated by the generator enters the magnetically conductive material.

In an alternative or additional embodiment, the field generator is elongated and has two generator ends, the card further comprising magnetically conducting elements configured to guide magnetic field from each generator end to a guide end. These conducting elements then may be, themselves, elongated having one end positioned in the vicinity of an end of the magnetically conductive element and another end positioned in the vicinity of an end of the generator so as to conduct field from the generator to the magnetically conductive material. These magnetically conducting elements may have a permeability of least 1000 μr, such as at least 2000 μr, preferably at least 5000 μr, such as at least 7500 μr, preferably at least 9000 μr, such as at least 15,000 μr, such as at least 20,000 μr, preferably at least 50,000 μr, such as at least 75,000 μr.

A second aspect of the invention relates to an assembly of a card according to the first aspect of the invention and a card reader comprising a reading head configured to be positioned at or travel a distance, in relation to the card, over the magnetically conducting material of the card while sensing the magnetic field and to output a signal relating to the field sensed.

In this context, the reading head may comprise a reading coil or detector configured to convert sensed/detected magnetic field into an output signal, which usually will be electrical but which may equally well be optical, wireless, radio-based, an audio signal or the like.

This reading coil or the reading head is configured to be positioned, relative to the card, directly above the predetermined curve or the magnetically conductive material. Most card readers are originally configured to provide or facilitate a relative movement of the card and reading head so that the reading head or reading coil travels along and directly above the predetermined curve and/or the magnetically conductive material. This is not a disadvantage according to the invention but it is not a requirement, as is described above. The reading head and/or reading coil may be stationary in relation to the card while detecting the field output, but the reading head/coil is still to be positioned directly above the curve/magnetically conductive material.

In this context, the reading head is over the curve or magnetically conductive material if it is positioned directly above this, i.e. a line perpendicular to the surface and intersecting the surface at the curve or magnetically conductive material will intersect the reading head.

Usually, the reading head has at least a first field sensor, such as a coil, having a magnetic conductivity of at least 100,000 μr, such as at least 200,000 μr. Often, such coils have a conductivity of around 300,000 μr.

Preferably, the reading head either contacts the surface during detection or sensing of the field from the magnetically conductive material, or any distance between the head and card surface is very low, such as no more than 1 mm, preferably no more than 500 μm, preferably no more than 250 μm, such as no more than 100 μm.

A third aspect of the invention relates to a method of assembling a card according to the first aspect of the invention, the method comprising the steps of:
1) providing a card blank,
2) fixing the field generator in relation to the card blank,
3) subsequent to step 2, fixing the magnetically conducting material in relation to the card blank.

In this respect, a card blank may be an element having an outer contour resembling that of the final card. Usually, a card blank is formed into the final card by, possibly among other steps, laminating it with one or more sheets or layers, such as printed layers, protection sheets or the like. In some types of cards, chips or other electronics are provided therein, as may switches, contacts, displays or the like.

Usually, the card blank will have the contour of the final card (contour of the card when projected on to the plane of the surface) and will represent most of the thickness thereof.

The card blank may be used as a stiff element forming a basis of the card.

The fixing of the generator in relation to the card blank may be a gluing, laminating, welding, soldering step, press fitting or the like.

The fixing may also be performed by providing the generator in a cut-out or concavity of the card blank in which the generator is enclosed, such as by adding a layer or sheet on top of the generator to enclose it in the cut-out or concavity.

The fixing of the magnetically conducting material may also be a gluing, laminating, welding, soldering step or the like. Preferably the magnetically conducting material forms part of a layer laminated on to the card blank.

Naturally, the fixing steps 2 and 3 may be reversed so that the magnetically conducting material is fixed to the blank before the field generator.

The fixing of the latter of the magnetically conducting material or field generator may be a fixing thereof in a position beside, below or above the firstly fixed one.

It is noted that the card may additionally comprise additional elements, such as a battery, a biometric reader, such as a finger print reader, one or more displays, one or more transmitters/transceivers, such as wireless transmitters/transceivers, such as a Bluetooth transceiver, a Wi-Fi transceiver, an RF transceiver or the like, antennas, a keyboard, one or more switches, such as blister switches or piezo based switches (see e.g. WO2008/104567) or the like.

In one embodiment, step 3) comprises providing no electrical connection between the magnetically conducting material and the field generator. Thus, reduced requirements may be obtained when manufacturing a card according to the invention compared to the situation where the generator must be positioned precisely in relation to the curve. In this situation, the field of the generator will still be able to flow to the magnetically conducting material even if the generator is slightly displaced in relation to its optimal situation.

Step 3) thus may be a simple lamination step.

A fourth aspect of the invention relates to a method of outputting a signal from a card according to the first aspect of the invention, the method comprising the step of operating the field generator to feed a magnetic field into the magnetically conducting material, the magnetically conducting material outputting the signal.

The above description of the curve, the magnetically conducting material, the generator etc. is equally valid in relation to the fourth aspect.

As mentioned above, the step of feeding the field into the magnetically conductive material may be obtained simply by positioning these elements suitably in relation to each other or, alternatively or in addition, by providing elements configured to guide the field from the generator to the magnetically conducting material and back.

In one embodiment, the operating step comprises operating the field generator to feed a magnetic field into the magnetically conducting material, which magnetic field varies over time. In this manner, the reading head may be stationary over the curve or may move over or along the curve and/or magnetically conductive material with any desired speed while detecting and outputting the desired signal.

A final aspect of the invention relates to a method of transferring information from a card, according to the first aspect of the invention, to a reading head, the method comprising:
  operating the field generator of the card to feed the magnetic field into the magnetically conducting material,
  positioning a reading device in the proximity of the magnetically conducting material during the operating step,
so that, during the operating step, at least a part of a magnetic field transported in the magnetically conducting material exits the magnetically conducting material and enters the reading device, and where the reading device outputs a signal corresponding to the at least part of the magnetic field entering the reading device.

The above description of the curve, the generator and the magnetically conducting material are equally valid in relation to this aspect.

The operating of the field generator may be feeding an electrical signal thereto, where the field generator is operational to convert the electrical signal into a magnetic signal. Preferably, the field generator is able to convert any time dependency or variation into a corresponding field strength dependency or variation. A typical field generator is a coil, optionally with a core material therein.

Thus, information may be encoded in the electrical signal, which information is present also in the field generated and thus in an output signal from the reading head.

The positioning step may comprise, as mentioned above, abutting the reading device, such as a reading head, and the card. Alternatively, a distance there between may be e.g. no more than 1 mm, preferably no more than 500 µm, preferably no more than 250 µm, such as no more than 100 µm. Preferably, the distance between the device and the card is maintained at least substantially constant during the operating step.

As mentioned above, the operating step may perform the feeding step automatically due to the emitted field itself choosing to travel through the magnetically conducting material.

The operating step comprises the device sensing the field in or emitted by the magnetically conducting material. This field will exit the magnetically conducting material in order to find a lower reluctance path back to the generator. Thus, again the operation may be fully automatic simply by selecting the parameters in a suitable manner. Suitable parameters for the individual elements are described further above.

In one embodiment, the positioning step comprises translating the reading device in relation to the card, preferably along the curve or magnetically conductive material.

Figure 2:
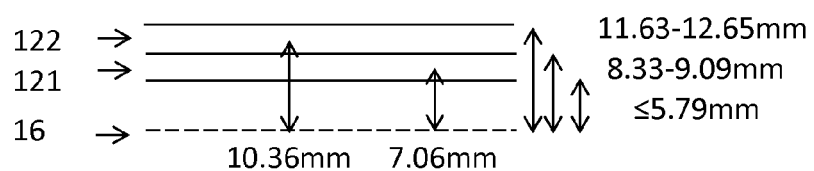
Figure 3:
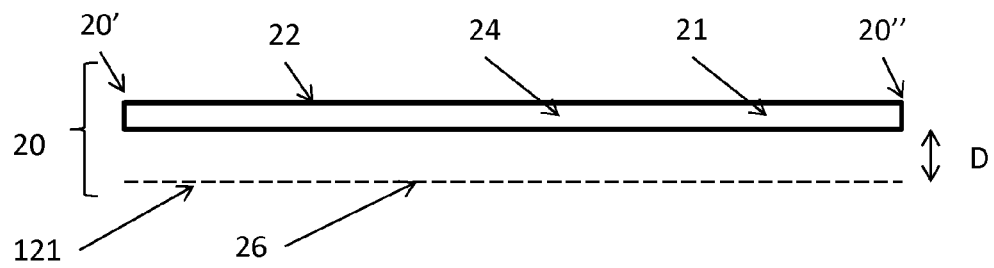
Figure 4:
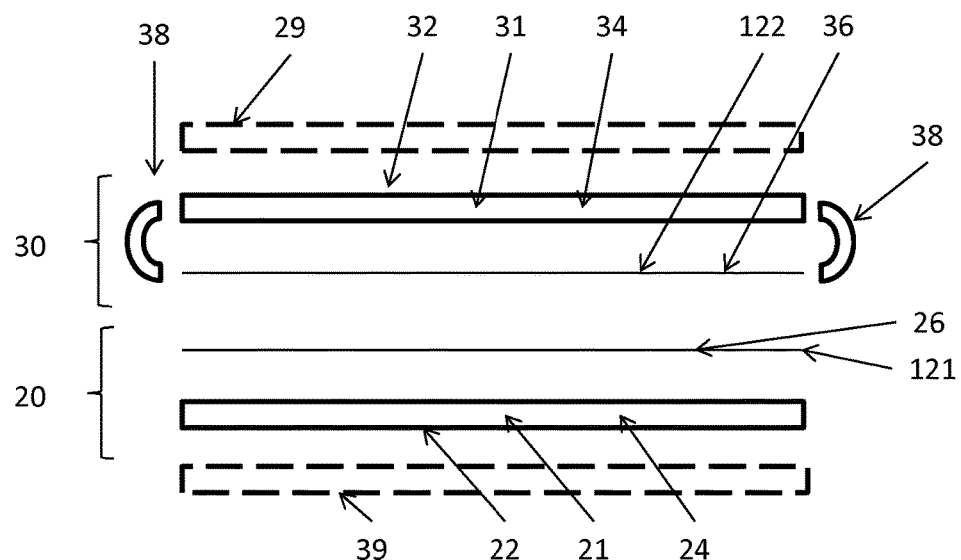
Figure 5:
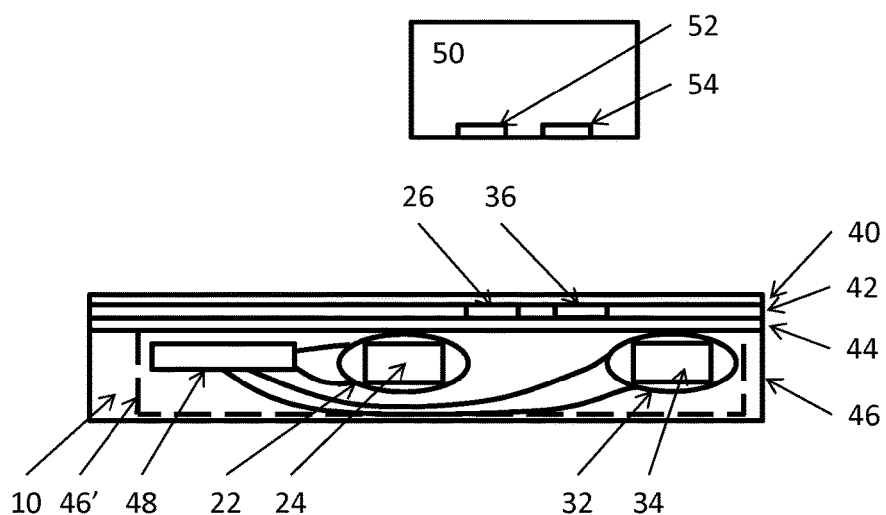

In the following, preferred embodiments of the invention will be described with reference to the drawings, wherein:
  FIG. 1 illustrates a credit card with a magnetic strip,
  FIG. 2 illustrates the standardized positions of the individual magnetic tracks of a magnetic card,
  FIG. 3 illustrates the relative positions of an encoder, a guide and a track position,
  FIG. 4 illustrates two field generators on a card, including compensating coils, and
  FIG. 5 illustrates a cross section of a card according to the invention.

In FIG. 1, a standard credit card 10 is illustrated having a magnetic area 12 positioned in a predetermined and standardized position. The magnetic area 12 typically comprises two individual strips or signal tracks, 121 and 122, of magnetically encoded information. The positions of these strips or tracks, 121 and 122 also are standardized.

According to ISO/IEC 7811-2:2001, the track 121, positioned the closest to the nearest longitudinal side 16 of the card 10 (see FIG. 2), has an edge closest to the side 16 of no more than 0.228" (5.79 mm). The boundary between the first and second tracks 121/122 is between 0.328" (8.33 mm) and 0.358" (9.09 mm) from the edge 16. The second track 122 extends to between 0.458" (11.63 mm) and 0.498" (12.65 mm) from the edge 16. A minimum track width is 0.100" (2.45 mm).

Different sources identify slightly different centre distances from the edge 16 to a centre of the tracks 121 and 122, but the following distances are seen: distance from edge 16 to centre of track 121: (0.228"+0.328")/2=0.278" (7.06 mm), distance from edge 16 to centre of track 122: (0.358"+0.458")/2=0.408" (10.36 mm).

Naturally, the tracks 121/122 may be positioned along any curves on the card. The straight lines are preferred as they facilitate a linear swipe or translation of the card in relation to the reader.

The preferred embodiments of the card of the invention have one or more magnetic encoders positioned at or near the track positions of the card. These encoders are able to generate a magnetic field emulating that of a legacy magnetic strip of a card translated in relation to a reader.

In FIG. 3, an encoder strategy is seen wherein a single encoder 20 is provided having a field generating element 21 comprising a coil 22 and a core 24, if desired, extending along, preferably parallel to, a curve 121 which is at one of the standardized positions of a magnetic track of a credit card. In addition, the encoder comprises a field guide 26 positioned at or below the curve position.

The ends 20' and 20" of the coil 22 or core 24, which ever extends the farthest to the right and to the left, defines end points at which a large part of a generated magnetic field is output and which will travel to the other end point in a manner defined by the card characteristics and the surroundings of the card 10.

The distance, D, between the ends 20' and 20" of the encoder 20 and the curve 121 and guide 26 is not critical, as the guide 26 will be selected by the field lines of the magnetic field due to its conduction characteristics—especially if or when no other magnetically conducting elements generally directed from the first end to the second end are provided.

It is noted that the main field emitted by the encoder 20 is output by the ends 20' and 20". Thus, when the positions of the ends 20' and 20" are fixed, any shape may, in principle, be used for the remainder of the encoder 20. An alternative to the straight encoder 20 of FIG. 3 is a bent or curved encoder, such as an encoder forming part of a circle, an oval or the like.

However, it has been found that the coil 22/core 24 do, in fact, also output a field between the ends. This effect may be utilized by varying the distance, along the longitudinal direction, between the coil 22/core 24 and the guide 26 to e.g. obtain that the same field strength travels inside the guide 26 along its length or that the same field strength is sensed by a reading head (see below) along the length of the guide 26. In this situation, the distance D would usually increase closer to the centre of the guide 26. Alternatively, it may be desired that the guide 26 and coil 22/core 24 are parallel, such as straight.

The operation of the encoder 20 is that a signal, corresponding to the magnetic field to be sensed by the reading head of a reader, which reading head is stationary over or travels along or over the field guide 26, is transmitted into the coil 22. As a result thereof, the coil 22 and core 24 outputs an magnetic field which travels into the field guide 26, via the ends thereof, to complete the unbroken field lines of the field. The field fed into the guide 26 is received both from the end portions of the core 22/coil 24 but also from positions along the length thereof (between the ends), depending on the distance between the coil 22/core 24 and the guide 26 along the length thereof.

When a reader head travels along the field guide 26, or is stationary in relation thereto, field lines within the field guide will choose to enter the reader head and thus feed part of the field into the reader head and thus transfer the information, while emulating the behaviour of a standard magnetic strip of a credit card.

The advantage of using the guide 26, compared to positioning the coil 22/core 24 at the curve, is that the magnetic field exiting the guide 26 and entering a reading head enters the reading head in the same manner, such as under the same angles, as those of the old-fashioned magnetic stripe cards. Thus, the field lines entering the reading head are suitably aligned compared to the coils in the reading head.

The width of the guide 26, perpendicular to the longitudinal direction thereof and parallel to the plane of the card surface may be 2.5 mm.

In FIG. 4, an encoder scheme is illustrated comprising, in addition to the encoder 20, a second encoder 30 as well as compensating elements to be described in further detail.

For illustrative purposes, the encoders 20 and 30 are different. A large variation in encoder schemes, as will also be described further below, may be used. Usually, identical encoder types are used in the same card.

The encoder 20, as in FIG. 3, comprises a field generating element 21 comprising an oblong core material 24 and a coil 22 wound around the core material 24. Parallel to the field generating element 21, a magnetic field guide 26, comprising a magnetically conductive material, is provided. The field guide 26 is provided at or along one of the standardized positions, 121, of the magnetic tracks of credit cards.

The encoder 30 comprises a field generating element 31 with a core 34, a coil 32 and a field guide 36 positioned at another of the standardized positions, 122, of magnetic tracks of credit cards. The encoder 30, however, also has guides 38 configured to guide magnetic field from the coil 32 and core 34 to the guide 36 in order to increase the coupling there between and reduce a loss of field to the surroundings.

In addition to the encoders 20/30, cross talk reducing coils 29/39, which may have cores or not, may be provided in order to prevent cross talk from one encoder to the other when operated simultaneously.

The function of the cross talk reducing coil 29 is to create an magnetic field at the guide 36 to counter the field created at the guide by the encoder 20 at the guide 36 when operating to generate the desired field at or in the guide 26. Thus, it is desired that the resulting field from the encoder 20 and the cross talk reducing coil 29, at the guide 36, is zero or as low as feasible.

The operation of the cross talk reducing coil 39 is similar.

An alternative to the operation of the cross talk reducing coils 29/39 is the subtraction, in the signal fed to the encoder 20, for example, of a signal correlated to that fed to the encoder 30 in order for the encoder 20 to, itself, output a field counter acting that of the encoder 30 at the position 121 or guide 26. Other solutions will be the subtraction of the cross talk signal in the reader if desired, as both the signal from the encoder 20 and that of the encoder 30 may be sensed by the reader.

In FIG. 5, a card 10 is illustrated in a cross section perpendicular to the coils, cores and guides. Illustrated is also electronics 48 for feeding electrical signals into the coils. The cross talk reducing coils 29/39 are not illustrated but may be provided or not. These usually are also fed by the electronics 48, but this is not a requirement.

Also illustrated is a reading head 50 comprising two reading coils 52 and 54 each positioned so as to travel along the tracks 121/122 and thus guides 26/36 while individually receiving the fields output by the guides 26/36, respectively. Usually, the reading coils 52/54 are positioned directly above (perpendicularly to the upper surface of the card) the guides 26/36 and/or the track positions 121/122. As mentioned above, the coils 52/54 may move along the curves or guides 26/36 or remain stationary in relation to the card 10.

The operation thus is as described above: the field generated by the generators is fed into the guides and from the guides, part of the field transported therein will enter the head 50 and thus the coils 52/54 positioned directly above and in close proximity to the guides.

Assembly of the card 10 may be performed by providing a base element 46 which may have an indentation or cut-out portion 46' into which a pre-assembled electronic package comprising the electronics 48, coils, cores and connecting wires may be provided. This package may comprise additional elements, such as a battery, a biometric reader, such as a finger print reader, one or more displays, one or more transmitters/transceivers, such as wireless transmitters/transceivers, such as a Bluetooth transceiver, a Wi-Fi transceiver, an RF transceiver or the like, antennas, a keyboard, one or more switches, such as blister switches or piezo based switches (see e.g. WO2008/104567) or the like.

The cut-away portion 46' and/or electronics may be covered by a layer 44. The guides 26/36 may be provided either individually or as a part of the layer 44 or a next layer 42. On top of the guides 26/36, a final layer 40 may be provided if desired.

It may be found advantageous to have the guides 36/26 form part of the outer, upper surface of the card in order for the card reader coils 52/54 to contact or be very close to the guides 26/36. The upper layer 40 may, on the other hand, be provided in order to protect the guides 26/36 from wear, oxidation and other types of degradation. Preferably, the upper layer 40 is rather thin, such as below 100 µm, such as below 50 µm and has a constant thickness along the direction of the guides 26/36.

It is noted that no electrical connections are required between the guides 26/36 and the coils 52/54 so that the assembly of the card may be quite simple, such as a standard lamination.

Naturally, the magnetic properties of the individual parts of the encoder should support the above functionality.

Thus, the coil of the encoder may be a single coil or a plurality of coils positioned along the elongated encoder, preferably with longitudinal axes along the encoder direction. The coil(s) may have the same or a varying pitch over the length. A varying pitch may be used for controlling the strength of a field output at the windings, i.e. between the ends.

A single coil of 1-10 mH is presently preferred.

It is noted, as mentioned above, that the coil may be bent so as to adapt the strength of transferred field along the length thereof to the guide.

The core may be one or more cores. Preferably, the core(s) is/are able to carry a large field strength without the material saturating. Different materials have different B-H curves describing the flux density as a function of magnetic field strength. A material with a straight B-H curve may be the VC6025Z (from www.VacuumSchmelze.de) which has a rather sharp "saturation corner", whereas mu-metal has a much softer characteristic. In the latter situation, the field strength may be kept sufficiently low for it to be in a linear area, or a compensation may be made either in the signal or in the detection.

Preferably, the permeability of the core material is 100-100,000 µr, such as 5,000-15,000 µr, such as around 10,000 µr. µr being the permeability relative to that of vacuum, µ0.

The sharper corner of the VC6025Z material will cause a higher distortion in case of saturation but may carry more field strength before distorting the output field The magnetic properties of the guide 26/36 preferably are slightly different from those of the core, as it is desired that part of the field lines actually exit the guide when the reading head approaches. Thus, the magnetic properties of the guide should be sufficiently good for the field lines to enter the guide at the ends of the encoder. On the other hand, the magnetic properties should be sufficiently low to have some of the field lines exit the guide and enter the reading head when approaching.

Thus, the permeability preferably is much higher than air and the bulk material of the card (such as plastics or polymers) and preferably lower than those of typical reading heads. Many reading heads have a permeability in the order of 300,000 µr.

Preferably, the guide has a permeability lower than that of the core (if provided at all), such as 100-10,000 µr, preferably 800-5,000 µr, such as around 1600 µr.

In this context, also the cross sectional dimensions of the guide(s) is of relevance, as the field lines travelling at the bottom of a relatively thick (in the direction perpendicular to the card surface) guide may not experience the effect of the reading head, whereby only a portion of the field lines in the guide will take part in the transfer of information.

The guide may have a wide variety of thicknesses. Generally, the lower the thickness, the higher is the permeability desired to still be able to attract and carry a sufficient field.

With a permeability around 1600 µr, a thickness of about 18 µm is suitable.

Naturally, the distance from the guide to the reading head is also of relevance. Preferably, the reading head is as close to the guides as possible. It may not be desired that the reading head touches the magnetically conducting material, such as during a translation, though. A distance of 0-500 µm, such as 5-50 µm, is desired, such as if provided through an upper layer of a material, so that the head may touch the card during translation.

In order for the guide to collect the magnetic field, it is desired that there are no other or better alternatives for the field in the vicinity of the field generator. Thus, preferably, apart from the coil(s), the core(s) and the guide, no other elements with a µr>100, such as a µr>10, are present in the card within 10 mm, such as within 5 mm, such as within 3 mm, such as within 2 mm, such as within 1 mm of a longitudinal or central axis of the coil(s) or the curve.

Also, it may be desired to alter a depth of the guide (distance from the surface to the guide) along its length in order to adapt a field strength transferred to a reading head travelling over the surface with a fixed distance to the surface. Thus, in one embodiment, the depth of the guide may be higher at a centre thereof than at the ends thereof.

The magnetic properties of the guide may be tailor-made if desired. For example, it may be preferred to provide a guide with different magnetic properties in different directions. For example, it may be desired to have a higher μr in a direction toward the surface or reading head than along the longitudinal direction of the guide. In this manner, field lines travelling far from the surface will see a lower μr when travelling up through the guide material and into the reading head, so that thicker guide materials may be used.

The guide material may be a metal. The guide material may be a monolithic material, such as a foil or tape. Alternatively, the guide material may be a powder moulded or otherwise provided into a carrier material, such as plastics, polymers or the like. The guide material may form part of a plastic sheet provided on the card. This may be obtained using co-extrusion, embedding, moulding or the like.

The invention claimed is:

1. A card configured to output a magnetic field on or at a surface thereof, the card comprising:
    an elongated magnetically conducting material on or at the surface of the card, the magnetically conducting material having a first and a second guide ends, the card being configured to provide the magnetic field along the magnetically conducting material, and
    a field generator positioned so as to feed a magnetic field into the magnetically conducting material,
    where the conducting material and the field generator are positioned beside each other and wherein the magnetically conducting material has a magnetic conductivity of 100-10,000 μr.

2. A card according to claim 1, the card having an outer, at least substantially straight side and wherein the curve is a straight line being at least substantially parallel to the side and positioned between 6.9 mm and 7.2 mm from the side.

3. A card according to claim 1, the card having an outer, at least substantially straight side and wherein the curve is a straight line being at least substantially parallel to the side and positioned between 10.2 mm and 10.5 mm from the side.

4. A card according to claim 1, wherein the magnetically conducting material has a magnetic conductivity of 800-5000 μr.

5. A card according to claim 1, wherein the magnetically conducting material has a thickness, in a direction perpendicular to the surface, of 5-200 μm.

6. A card according to claim 1, wherein the field generator comprises an elongated coil positioned at least substantially parallel to the magnetically conductive material.

7. A card according to claim 1, wherein, in a cross section perpendicular to the curve, the field generator is positioned no more than 5 mm from the magnetically conductive material.

8. A card according to claim 1, wherein the field generator is elongated and has two generator ends, the card further comprising magnetically conducting elements configured to guide magnetic field from each generator end to a guide end.

9. A card according to claim 1, wherein a width of the magnetically conductive material is no more than 5 mm.

10. A card according to claim 1, wherein the magnetically conductive material is positioned no more than 0.3 mm from the surface.

11. A card according to claim 1, wherein the field generator is positioned so as to feed the magnetic field into at least the guide ends of the magnetically conducting material.

12. An assembly of a card according to claim 1 and a card reader comprising a reading head configured to be positioned at, or travel a distance over, in relation to the card, the magnetically conducting material of the card while sensing the magnetic field and to output a signal relating to the field sensed.

13. An assembly according to claim 12, wherein the reading head comprises at least a first field sensor having a magnetic conductivity of at least 100,000 μr.

14. A method of assembling a card according to claim 1, the method comprising the steps of:
    1) providing a card blank,
    2) fixing the field generator in relation to the card blank,
    3) subsequent to step 2), fixing the magnetically conducting material in relation to the card blank.

15. A method according to claim 14, wherein step 3) comprises providing no electrical connection between the magnetically conducting material and the field generator.

16. A method of outputting a signal from a card according to claim 1, the method comprising the step of operating the field generator to feed a magnetic field into the magnetically conducting material, the magnetically conducting material outputting the signal.

17. A method according to claim 16, wherein the operating step comprises operating the field generator to feed a magnetic field into the magnetically conducting material, which magnetic field varies over time.

18. A method of transferring information from a card, according to claim 1, to a reading head, the method comprising:
    operating the field generator of the card to feed the magnetic field into the magnetically conductive material,
    positioning a reading device in the proximity of the magnetically conducting material during the operating step,
so that, during the operating step, at least a part of a magnetic field transported in the magnetically conducting material exits the magnetically conducting material and enters the reading device, and where the reading device outputs a signal corresponding to the at least part of the magnetic field entering the reading device.

19. A method according to claim 18, wherein the positioning step comprises translating the reading device in relation to the card.

20. A card according to claim 1, the card having an outer, at least substantially straight side and wherein the conducting material is an at least substantially straight strip of a magnetically conducting material having a first edge closest to the side and a second edge, the first edge being positioned no more than 0.228" (5.79 mm) from the side, and the second edge being positioned no more than 0.358" (9.09 mm) from the side.

21. A card according to claim 1, the card having an outer, at least substantially straight side and wherein the conducting material is an at least substantially straight strip of a magnetically conducting material having a first edge closest to the side and a second edge, the first edge being positioned at least 0.328" (8.33 mm) from the side, and the second edge being positioned no more than 0.498" (12.65 mm) from the side.

* * * * *